United States Patent
Isnardi (10) Patent No.: US 6,687,384 B1
(45) Date of Patent: Feb. 3, 2004

(54) METHOD AND APPARATUS FOR EMBEDDING DATA IN ENCODED DIGITAL BITSTREAMS

(75) Inventor: Michael A. Isnardi, Plainsboro, NJ (US)

(73) Assignee: Sarnoff Corporation, Princeton, NJ (US)

(*) Notice: Subject to any disclaimer, the term of this patent is extended or adjusted under 35 U.S.C. 154(b) by 0 days.

(21) Appl. No.: 09/535,213

(22) Filed: Mar. 27, 2000

(51) Int. Cl.$^7$ ............................................. G06K 9/100
(52) U.S. Cl. .................................. 382/100; 382/236
(58) Field of Search ........................... 382/100, 232, 382/233–236, 245–247, 251, 248, 253; 341/50; 345/501; 348/383, 420.1, 423.1, 745, 425.4; 370/392; 375/240.03, 240.26; 712/300

(56) References Cited

U.S. PATENT DOCUMENTS

| | | | | |
|---|---|---|---|---|
| 5,365,552 A | * | 11/1994 | Astle | 375/354 |
| 5,488,570 A | * | 1/1996 | Agarwal | 345/501 |
| 5,502,494 A | * | 3/1996 | Auld | 375/240.25 |
| 5,515,296 A | | 5/1996 | Agarwal | |
| 5,519,780 A | * | 5/1996 | Woo et al. | 725/137 |
| 5,686,965 A | * | 11/1997 | Auld | 375/240.01 |
| 5,696,848 A | * | 12/1997 | Patti et al. | 382/254 |
| 5,703,793 A | * | 12/1997 | Wise et al. | 382/232 |
| 5,841,886 A | * | 11/1998 | Rhoads | 382/115 |
| 5,881,176 A | * | 3/1999 | Keith et al. | 382/248 |
| 6,208,746 B1 | * | 3/2001 | Musgrave | 382/100 |

FOREIGN PATENT DOCUMENTS

| | | | |
|---|---|---|---|
| WO | WO 96/36163 | * | 11/1996 |
| WO | WO 97 13248 | | 4/1997 |
| WO | WO 98/31152 | | 7/1998 |

OTHER PUBLICATIONS

Hartung F. et al, Digital Watermarking Of MPEG–4 Facial Animation Parameters, Computer and Graphics, Pergamon Press LTD., Oxford, Great Britain, vol. 22, No.: 4, Jul. 1998, pp. 425–435, XP000931103, ISSN: 0097–8493.

Song J. et al, "A Data Embedding Scheme For H.263 Compatible Video Coding", ISCAS '99, Proceedings Of The 1999 IEEE International Symposium on Circuits And Systems, Orlando, FL, May 30–Jun. 2, 1999, IEEE International Symposium on Circuits And Systems, New York, NY: IEEE, US, vol. 6 of 6, Jun. 1999, pp. 390–393, XP000937729 ISBN: 0–7803–5472–9, The whole document.

(List continued on next page.)

Primary Examiner—Jayanti K. Patel
(74) Attorney, Agent, or Firm—William J. Burke (57) ABSTRACT

A method and apparatus for embedding data in an encoded video bitstream, for example, an MPEG or MPEG-like bitstream, wherein the bitstream includes redundantly coded syntax element values of which one is an overriding value, includes mandatorily coding the syntax element overriding value and replacing the non-overriding syntax element value with the data to be embedded. Apparatus for embedding data in such bitstream includes a coder creating the coded video bitstream with such value mandatorily coded in the overriding syntax element position therein, and a data inserter for inserting the data to be embedded into the non-overriding syntax element position. In an MPEG compressed bitstream, the quantization scale code (QSC) value is mandatorily explicitly coded in the first coded macroblock following a slice header and the embedded data is inserted into the QSC position in the slice header. The invention may be embodied in a computer implemented process and/or in apparatus performing such computer implemented process.

32 Claims, 4 Drawing Sheets

OTHER PUBLICATIONS

Meng J. et al, "Embedding Visible Video Watermarks In the Compressed Domain", Proceedings of the 1998 International Conference On Image Processing. ICCIP '98, Chicago, IL., Oct. 4–7, 1998, International Conference On Image Processing, Loss Alamitos, CA: IEEE Computer Soc, US, vol. 1 Conf. 5, 1998, pp. 474–477, XP000863533, ISBN: 0–8186–8822–X, The whole document.

Kiya, H. et al, "A Method Of Inserting Binary Data Into MPEG Bitstreams For Video Index Labeling", Proceedings 1999 International Conference On Image Processing. ICIP '99. Kobe, JP, Oct. 24–28, 1999, International Conference On Image Processing, Los Alamitos, CA: IEEE, US, vol. 4 of 4, Oct. 24, 1999, pp. 285–289, XP000895526 ISBN: 0–7803–5468–0, The whole document.

Hartung, F., et al, "Copyright Protection In Video Delivery Networks By Watermarking Of Pre–Compressed Video", Proceedings Of The European Conference On Multimedia Applications, Services And Techniques, XX, XX, May 21, 1997, pp. 423–436, XP000931338, The whole document.

PCT International Search Report, PCT/US01/08675, Oct. 15, 2001, 4 Pages.

International Preliminary Examination Report, PCT Application No.: PCT/US01/08675, dated Jan. 2, 2003.

Michael A. Isnardi, *MPEG–2 Video Compression,* Nov. 29, 1999, pages 67, Sarnoff Corporation, Princeton, New Jersey.

* cited by examiner

METHOD AND APPARATUS FOR EMBEDDING DATA IN ENCODED DIGITAL BITSTREAMS

The present invention relates to embedding digital data in encoded digital data and, in particular, to a method and apparatus therefor.

More and more information is becoming available in digital form, whether the information be video or audio entertainment, video or film images, computer programs or computer generated information, literary material or other data content or programming, and the sources thereof include the Internet, CD-ROMs, DVDs, terrestrial and satellite broadcasting, and the like. Such digital information is of greater interest to hackers and thieves who seek to obtain or appropriate such content or program by other than legitimate means owing to the ability of data or information in digital form to be copied many times without loss or corruption of the data or information. Such high-quality copies can be made by pirates and others quickly and at virtually no cost other than that of the recording medium.

One defense against such acts is provided by security schemes, such as firewalls, anti-copying schemes, encryption and the like, which are intended to provide an obstacle or barrier to prevent the unauthorized copying of the protected digital information. Complementary to security schemes are identification schemes that provide unique identifying characteristics to the digital information so that if it is copied or pirated, the copy will contain the identifying characteristic which may be used to prove the source and origin of the copied file, e.g., to authenticate the identity of the copyright owner. A physical analog to this is to engrave the owner's name on a physical object. Preferably the identifying information is hidden so that a pirate or thief will not recognize it and so will not obliterate it in an attempt to preclude tracing the copied content to its rightful owner. A physical analog to this is the marking of automobile parts with the serial number of the automobile, usually in unobvious or hard to find places, for subsequently identifying stolen cars and parts thereof.

Information may be encoded for transmission in digital form by any number of encoding schemes, such as the encoding standards promulgated by the International Standards Organization, Geneva, Switzerland, for example, International Standard ISO/IEC 13818-1, "Information Technology—Generic Coding or Moving Pictures and Associated Audio: Systems," commonly referred to as MPEG-2 Systems, and International Standards ISO/IEC 11172-2 and ISO/IEC 13818-2, "Information Technology—Generic Coding or Moving Pictures and Associated Audio: Video," commonly referred to as MPEG-1 Video and MPEG-2 Video., respectively.

Identification information is conventionally embedded in information coded in the MPEG-2 standard, for example, by slightly modifying pixel samples for groups of audio or video pixels during signal coding in a way that is hopefully not apparent in the reproduced data when properly decoded. This technique is often referred to as "digital water marking" due to its similarity to the conventional water marking of papers to provide a visual indication of the manufacturer or originator thereof (e.g., as for stationery), or the authenticity of a document or instrument made thereof (e.g., stock certificates and currency). Whether the embedded digital watermark information is inserted into the video signal itself (pixel-domain techniques) or in the compressed MPEG or MPEG-like video bitstream (compressed domain techniques), the video quality is necessarily degraded to some extent in that noise-like patterns are superimposed on the video, usually at levels below the visual threshold of a typical viewer.

Although conventional water marking may be inserted either during or after compression of the data by MPEG-2 coding, certain disadvantages arise because it is in the pixel domain. For example, MPEG compression may degrade or remove the watermark (although the watermark should be able to survive moderate additional decoding and recoding). In addition, the watermark must be at a low level so as to not to be apparent in or degrade the decoded data, such as the reproduced image or other data, and so is limited to a very low bit rate, e.g., only 64 bits/frame or less, and is not useful where a higher bit-rate is desired, e.g., 150–340 bits/frame or higher. Moreover, water marking is easily detected and mapped, and then removed, if one has access to two copies of the same data, such as an unwatermarked original and a watermarked copy or two differently watermarked copies.

Accordingly, there is a need for identifying or other information to be inserted into coded digital data in a way that does not degrade the decoded data. It is also desirable that the bit rate of the inserted information be substantially higher than that available with conventional data water marking.

To this end, the method of the present invention is for embedding data in a coded bitstream wherein the coded bitstream has at least one syntax element that can be coded in plural positions, the value thereof coded in one position being overriding respecting the value coded in the other position, which method comprises:

coding a value of the one syntax element in the overriding syntax element position; and inserting the embedded data into the other syntax element position.

According to a further aspect of the invention, a coder for embedding data in a coded bitstream having headers and data blocks wherein the coded bitstream has at least one syntax element that can be coded in a header and in a data block position, comprises means for coding a bitstream having at least one syntax element that can be coded in a header and in a data block position, wherein the value thereof coded in one of the header and the data block positions is overriding respecting the value coded in the other of the header and data block positions, means for coding a value of the one syntax element in the overriding one of the header and data block positions, and means for inserting the embedded data into the other of the header and data block positions.

BRIEF DESCRIPTION OF THE DRAWING

The detailed description of the preferred embodiments of the present invention will be more easily and better understood when read in conjunction with the FIGURES of the Drawing which include.

In the Drawing, where an element or feature is shown in more than one drawing figure, the same alphanumeric designation may be used to designate such element or feature in each figure, and where a closely related or modified element is shown in a figure, the same alphanumerical designation primed may be used to designate the modified element or feature. Similarly, similar elements or features may be designated by like alphanumeric designations in different figures of the Drawing and with similar nomenclature in the specification, but in the Drawing are preceded by digits unique to the embodiment described. For example, a particular element may be designated as "xx" in one figure, by "1xx" in another figure, by "2xx" in another figure, and so on.

DESCRIPTION OF THE PREFERRED EMBODIMENT

As used herein, "watermarking" refers to the embedding of information in signals coded in accordance with the MPEG or an MPEG-like coding standard by modifying pixel samples for groups of audio or video samples during signal coding, and "watermark" refers to the information embedded by watermarking. Watermark information is present in the decoded signals produced by a standard decoder operating in accordance with the appropriate MPEG or MPEG-like coding standard. Whether the embedded digital watermark information is inserted into the signal itself (pixel-domain techniques) or in the compressed MPEG or MPEG-like bitstream (compressed domain techniques), the video quality is necessarily degraded to some extent in that noise-like or other patterns are superimposed on the audio and/or video, usually at levels below the threshold of aural and/or visual perception.

As used herein "data hiding" refers to the embedding of information into signals that have been coded in accordance with the MPEG or an MPEG-like coding standard, wherein the information is embedded in the coded signal syntax without altering the pixel samples of either the audio or video pixels, and "hidden data" refers to the information embedded or to be embedded by data hiding. Hidden data is not present in the decoded signals produced by a standard decoder operating in accordance with the appropriate MPEG or MPEG-like coding standard.

An "MPEG" or an "MPEG-like" coding standard refers to the ISO/IEC standards identified above as well as any other coding standard that employs a coded syntax that can include redundant or plural specification of any parameter or value wherein at least one of the redundant or plural specifications can be replaced in whole or in part by unrelated data. MPEG includes MPEG-1 and/or MPEG-2 and/or subsequent MPEG standards.

Figure 1:
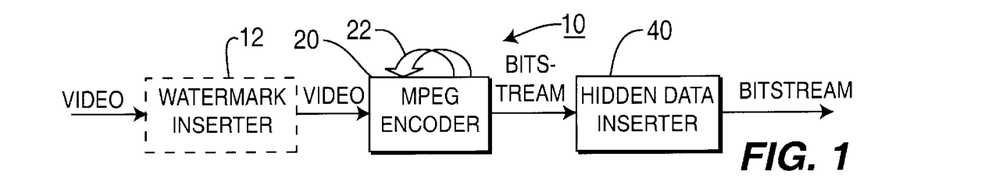
FIG. 1 is a schematic block diagram of an exemplary embodiment of a data embedding arrangement in accordance with the present invention.

FIG. 1 is a schematic block diagram of an exemplary embodiment of a data embedding arrangement 10 employing data hiding in accordance with the present invention. Video data in digital format is applied to a video encoder 20 such as an MPEG video encoder that codes the video in accordance with an MPEG or MPEG-like coding standard. Arrow 22 indicates that in one embodiment of the invention MPEG encoder 20 is modified so that, in addition to coding the video data according to an MPEG standard, it also inserts into or embeds in the coded video additional information in the form of hidden data as described below. In that case, the bitstream 24 produced by MPEG encoder 20 is a compliant bitstream coded in accordance with an MPEG or MPEG-like standard that also includes hidden data in accordance with the invention, and hidden data inserter 40 is not necessary.

Optionally, the video data may be processed by a conventional watermark inserter 12 (shown in phantom) which applies a watermarking pattern to the pixel samples thereof prior to the video data being applied to coder 20 where it is desired to utilize the present data hiding invention in conjunction with conventional watermarking of video data.

Alternatively, a standard MPEG encoder 20 may produce a bitstream including the input video data coded in accordance with an MPEG standard coding standard. Thereafter the bitstream 24 is processed by hidden data inserter 40 which inserts into the MPEG coded video bitstream additional information in the form of hidden data as described below. The bitstream produced thereby is a bitstream coded in accordance with an MPEG or MPEG-like standard that also includes hidden data in accordance with the invention, the bitstream with data hidden therein being compliant with the applicable MPEG or MPEG-like standard and able to be decoded by decoders compliant to that standard.

Because the hidden data is embedded directly into MPEG and MPEG-like syntax elements, there is no correlative degradation of the video elements and thus no degradation to the quality of the video that can be produced when the signal is decoded. As will become evident, the hiding of data is provided with a low overhead of additional apparatus and coded information, yet provides data rates for the hidden information that is substantially higher than that provided by conventional watermarking methods.

Figure 2A:
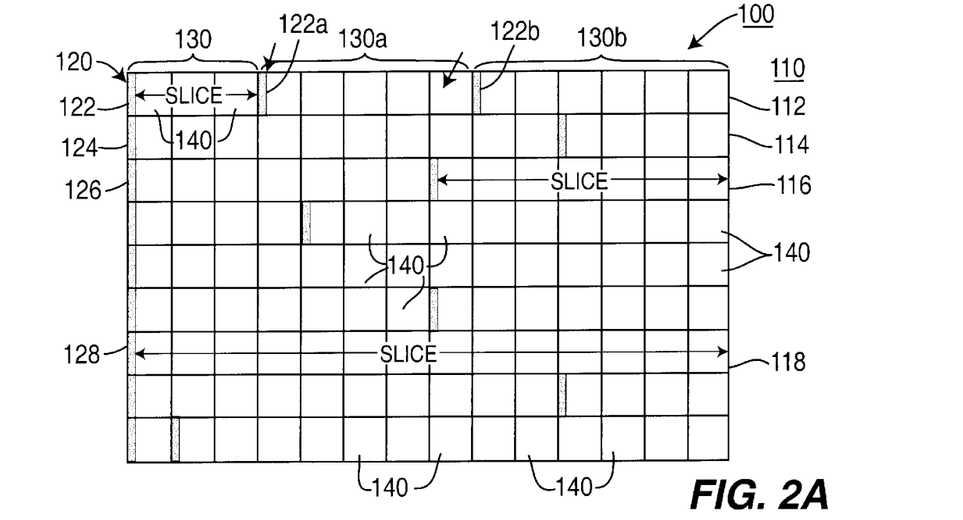
FIGS. 2A and 2B are diagrams of exemplary digital data coded in slices and macroblocks in accordance with an MPEG or an MPEG-like coding scheme.
Figure 2B:
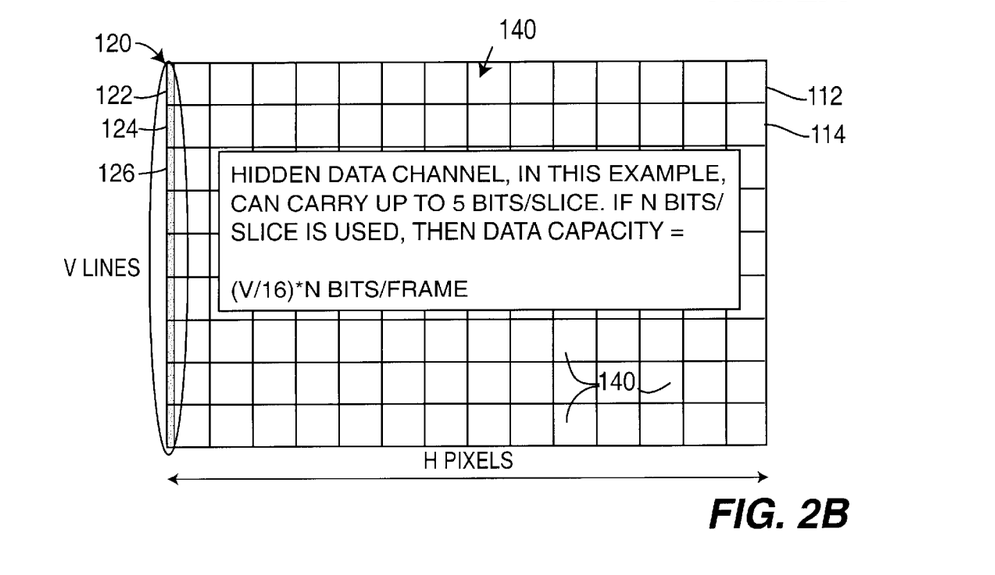

FIGS. 2A and 2B are diagrams of exemplary digital data coded in slices 130 and macroblocks 140 in accordance with an MPEG or an MPEG-like coding scheme. A frame 100 of coded data is organized into a number of rows 110 in row sequence order of rows 112, 114, 116 and so forth. Mandatory slice headers 120 are required at the beginning of each and every row 110 and contain syntax information pertaining to the coding of information in the macroblocks 140 that follow (each square in FIGS. 2A and 2B representing a macroblock 140). Thus, mandatory slice header 122 includes syntax information pertaining to the three macroblocks 140 following immediately thereafter, and mandatory slice header 124 includes syntax information pertaining to the ten macroblocks 140 following immediately thereafter, and so forth.

A row may include any number of slices 130 between one and the number of macroblocks 140 in the entire row. Neither the number of slices in a row nor the number of macroblocks in the slices need be the same or consistent from slice to slice or from row to row. Row 112, for example, includes three slices 130, a first including three macroblocks 140, a second including five macroblocks 140 and a third including six macroblocks 140. Row 114, for example, includes two slices 130, a first including ten macroblocks 140, and a second including four macroblocks 140. Each slice 130 could include only a single macroblock 140, but that is less efficient in the coding of information and in the computational intensity of coding which must include greater numbers of bits in the coded bitstream. A row such as row 118, for example, is a single slice 130 that includes all of the macroblocks 140 in row 118, an arrangement that generally provides the best coding efficiency.

In the frame 100 of FIG. 2B, each row includes one slice 130 that contains all of the macroblocks 140 in that row. A frame 100 is a number V of lines vertically and a number H of pixel samples horizontally, for example, representative of a raster scanned image, as is conventionally utilized in television and other video presentation formats. Each row 110 is a slice 130 including plural macroblocks 140 corresponding to a horizontal line of pixel samples coded in raster-scan order. A plurality of row-slices 110–130 in vertical scan order comprise the frame 100. This sort of frame coding is utilized when video information is coded in accordance with the MPEG-2 video coding standard, and is typical for "Main Profile" applications, for example, for broadcast and multimedia as in digital television transmission as from terrestrial transmitters or direct broadcast satellites, or over cable television, Internet, CD-ROM, DVD or other transmission media. Although a slice can be less than an entire row in the MPEG-2 Main Profile video coding, that is seldom the case in practice due to unnecessary bit overhead. In the MPEG-1 video coding standard, a slice can be as small as one macroblock and as large as an entire frame, with the macroblocks in raster-scan order.

Figure 3A:
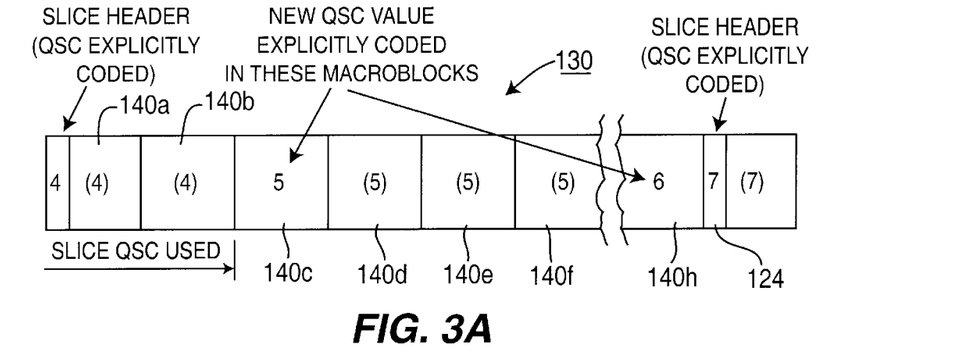
FIGS. 3A, 3B and 3C are diagrams of exemplary slices of coded macroblocks of an MPEG or an MPEG-like coded digital data, such as the coded digital data of FIGS. 2A and 2B.
Figure 3B:
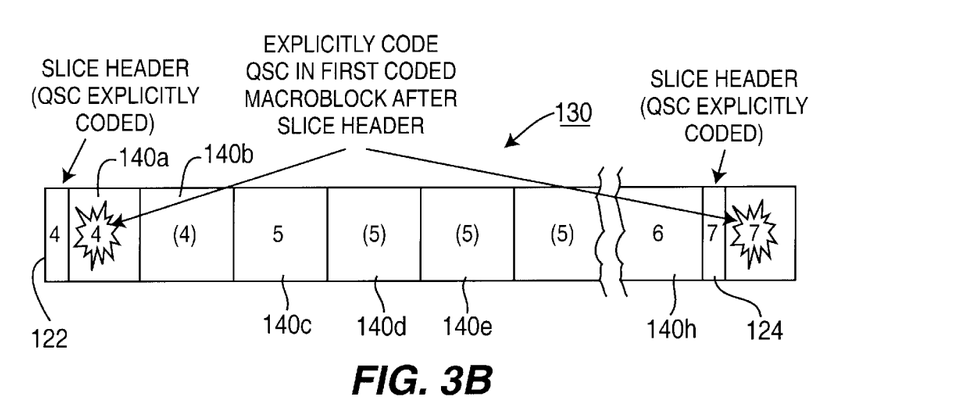
Figure 3C:
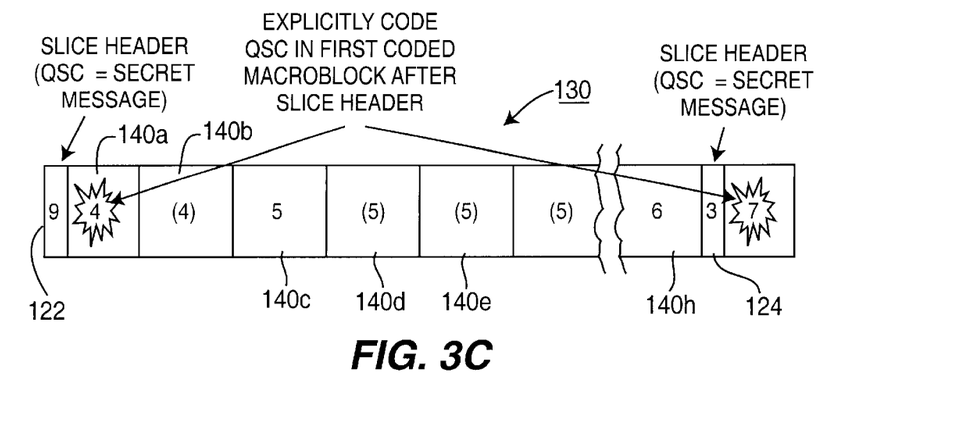

FIGS. 3A, 3B and 3C are diagrams of exemplary slices 130 of number "n" coded macroblocks 140 of an MPEG or an MPEG-like coded digital data, such as the coded digital data frames 100 of FIGS. 2A and 2B. Exemplary slice 130 of FIG. 3A includes slice header 122 followed by a plurality of macroblocks 140*a*, 140*b*, 140*c*, . . . , 140*n*, followed by slice header 124 of the next following slice, and so forth. Video information is coded in each slice header and in each macroblock in accordance with the appropriate MPEG or MPEG-like coding standard. In MPEG-2 video coding, for example, each coded macroblock 140 includes a 16×16 array of luminance pixel samples including a sub-sampled array of chrominance pixel samples, and so there are V/16 rows per frame and H/16 macroblocks per row in the coded signal bitstream. For example, in a standard definition video image containing 480 horizontal scan lines from top to bottom, a frame includes 480/16=30 slices, assuming one slice per row of macroblocks as shown in FIG. 2B. An MPEG macroblock is called "coded" whenever at least one quantized discrete cosine transform (DCT) of any element coefficient in any 8×8 block comprising that macroblock has a non-zero value.

In addition to the pixel samples for luminance and chrominance, each coded macroblock includes coding syntax information or elements in a macroblock header that specify the coding of the DCT coefficients and therefore how the decoder should operate in decoding the DCT coefficients in that macroblock. These syntax elements may be explicitly coded in a macroblock, i.e. the element value is actually specified and contained in the macroblock header, or the element value may be implicitly coded in which case the macroblock does not contain the syntax element value and the macroblock is decoded in accordance with the syntax element value as specified in a prior slice header or macroblock.

One such element value is the quantization scale code or QSC which relates to the scaling quantization that has been applied in compression coding the pixel samples and which is to be used in decoding those samples. The QSC may be explicitly coded or implicitly coded in each macroblock 140, but must be explicitly coded in each slice header 120. Thus, the value of the QSC syntax element is coded at two different "layers" in the MPEG coded bitstream—in the slice layer and in the macroblock layer. In FIGS. 3A, 3B and 3C, an explicitly coded QSC is represented by a number inside a macroblock 140 or a slice header 130, and an implicitly coded QSC is represented by a number therein in parentheses. The QSC is a five-bit word that can take any value except "00000" in the MPEG-1 and MPEG-2 coding standards.

In FIG. 3A, an exemplary MPEG slice 130 includes a slice header having an explicitly coded QSC value of "4". Macroblocks 140*a*, 140*b* immediately following slice header 122 have no explicitly coded QSC value and so are implicitly coded in that they utilize the QSC value specified in slice header 122, as shown by the "(4)" therein. Macroblock 140*c* has an explicitly coded QSC value of "5" which is the value implicitly coded for macroblocks 140*d*, 140*e* and 140*f* immediately following. The last macroblock 140*n* of this slice is explicitly coded at the value "6" and the immediately following slice header 124 has a different explicitly coded QSC value of "7" and so forth in like manner. Thus there is complete freedom in using explicit and implicit QSC coding in the macroblocks 140, but explicit QSC coding is mandatory for the slice headers 122, 124. Typically, the QSC value does not change much from macroblock to macroblock and so, for increased coding efficiency, the macroblock QSC is explicitly coded and transmitted only if different from the QSC value coded in the slice header. Since the slice QSC value is always explicitly coded, its value is used by subsequent macroblocks until another QSC value is explicitly coded, either at the slice or macroblock layer, i.e. in a subsequent slice header or macroblock header. Implicit coding of QSC at the macroblock layer saves bits in normal operation.

In FIG. 3B, an MPEG slice 130 includes a slice header having an explicitly coded QSC value of "4". In this example, however, macroblock 140*a* immediately following slice header 122 has an explicitly coded QSC value of "4" and macroblock 140*b* thereafter has no explicitly coded QSC value and so is implicitly coded to utilize the QSC value specified in macroblock 140*a*, as shown by the "(4)" in macroblock 140*b*. Macroblocks 140*c* through 140*n* are explicitly and implicitly coded similarly to those of FIG. 3A, and both slice header 124 and the macroblock immediately thereafter are explicitly coded to the QSC value "7". It is thus seen that when the first macroblock 140*a* following the slice header 122 is explicitly coded, i.e. is a coded macroblock, that the mandatory explicitly coded QSC value coded in slice headers 122, 124 contains redundant or superfluous information that is ignored in the decoding of the compressed bitstream.

In accordance with the invention, this redundant information contained in the mandatory explicit coding of the QSC value in the slice headers may be removed to create a data channel utilizing the QSC syntax element coding position in the slice headers. Because this information truly is redundant owing to the explicit coding of the QSC value in the first coded macroblock following each slice header, there is no degradation of the video information coded in any of the macroblocks, slices and frames, as is the case with conventional watermarking. While there remains complete freedom in using explicit and implicit QSC coding in the macroblocks 140, in accordance with the invention, explicit QSC coding becomes mandatory for the first coded macroblock following each slice header.

In FIG. 3C is shown a slice 130 in accordance with the invention including a hidden data channel in slice headers 122, 124 and so forth. First coded macroblock 140a following slice header 122 is explicitly coded to the QSC value "4" and the first coded macroblock 140 of each slice is also explicitly coded with a QSC value. Hidden data or a "secret message" is substituted for the mandatorily coded QSC value in each slice header, for example with the value "9" in slice header 122 and the value "3" in slice header 124. In the MPEG-1 (ISO/IEC 11172-2) and MPEG-2 (ISO/IEC 13818-2) video specifications, the five-bit QSC syntax element coding of the quantization scale code provides a five-bit per line data channel into which data unrelated to the video may be inserted, thereby providing a data channel having about a 150 bit per frame or 4500 bit per second data rate. The actual data rate is slightly less because of the need to avoid the prohibited QSC code value "00000" as mentioned.

It is noted that a compliant MPEG-1 or MPEG-2 decoder will ignore the hidden data embedded in the QSC syntax element position of the slice headers because they are overridden by the explicitly coded QSC values contained in the respective first coded macroblocks immediately thereafter. A modified compliant MPEG decoder can extract the hidden data from the slice headers, as described below, and such extracted data can be utilized for many different purposes.

Figure 4:
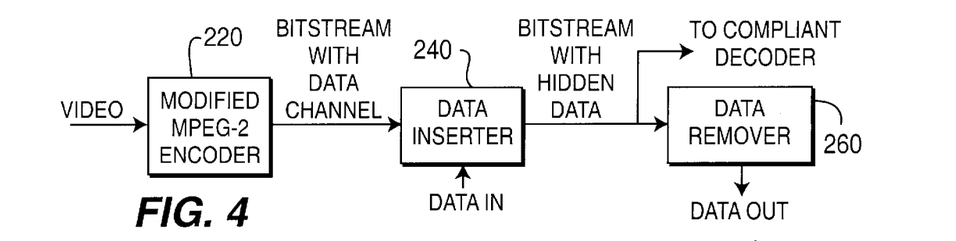
FIGS. 4 and 8 are schematic block diagrams of exemplary embodiments of macroblock coders and data inserters useful in accordance with the invention.

FIG. 4 is a schematic block diagram of an exemplary embodiment of a macroblock coder 220 and data inserter 240 useful in accordance with the invention. Video data applied to modified MPEG-2 encoder 220 is compression coded in accordance with the MPEG-2 coding standard to produce an MPEG-2 compliant bitstream. In addition, that coding by encoder 220 is modified in that the value of the quantization scale code syntax element is explicitly coded into the first coded macroblock following each slice header, so that the QSC syntax coding position in each slice header contains redundant QSC value data. These QSC syntax coding positions in the slice headers provide a data channel into which data may be inserted, which data is hidden data and need not be related in any way to the video data. Data inserter 240 receives the bitstream having a data channel formed in the slice header QSC syntax element position and inserts the desired data "Data In" into that data channel to produce a bitstream that is compliant with the MPEG-coding standard and which includes hidden data in the data channel. Ultimately, the compliant bitstream and DATA IN data hidden therein is applied to a standard MPEG-compliant decoder (not shown) for extracting the video data therefrom, and is also applied to a data remover 260 which locates the DATA IN data hidden in the data channel, i.e. in the QSC element position of the slice headers, to extract the embedded or hidden DATA IN data from the data channel and reproduce same as Data Out.

It is noted that the embodiment of FIG. 4 is preferred because embedding of the hidden data in the compressed video bitstream is easily and automatically accommodated in conjunction with the coding of the video bitstream. Specifically, the rate control function of modified coder 220 automatically takes into account the additional bits introduced by explicitly coding the QSC value in the first coded macroblock of each slice, and so produces a compressed coded video bitstream that is compliant with the coding standard.

Figure 5:
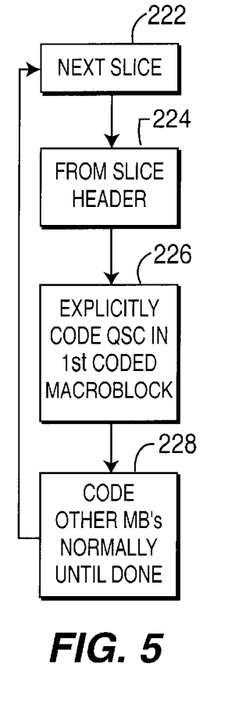
FIG. 5 is a schematic flow diagram illustrating the method of a slice coding loop in an MPEG or MPEG-like coding arrangement, for example, in the modified MPEG-2 encoder shown in FIG. 4.

The operation of modified MPEG-2 encoder 220 of FIG. 4 may be understood with reference to FIG. 5 which is a schematic flow diagram illustrating the method of a slice coding loop in an MPEG or MPEG-like coding arrangement. A slice is provided 222 and a slice header is formed therein 224 and is adapted to receive the necessary syntax element coding in accordance with the MPEG coding standard, including a position for receiving the five-bit value of the QSC syntax element. The first coded macroblock following each slice header is explicitly coded 226 with the value of the QSC syntax element. The remainder of the macroblocks in the slice are coded 228 in the normal manner until all of the macroblocks in the slice are coded. The next slice is then obtained 222 and the process repeats for as long as there is data to be encoded in slices.

Figure 6:
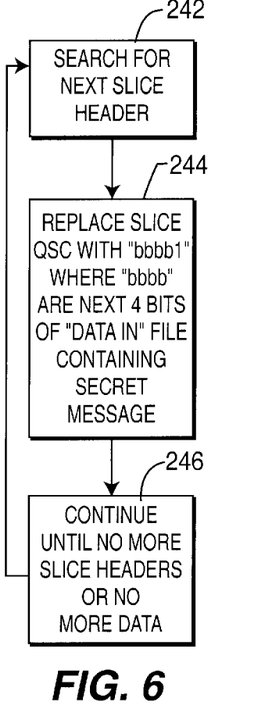
FIG. 6 is a schematic flow diagram illustrating the method of inserting data in an MPEG or MPEG-like coding arrangement, for example, in the data inserter shown in FIG. 4.

The operation of data inserter 240 of FIG. 4 may be understood with reference to FIG. 6 which is a schematic flow diagram illustrating the method of inserting or embedding data into a hidden data channel in a bitstream coded in an MPEG or MPEG-like coding arrangement. Data inserter 240 searches 242 the bitstream having a data channel for the next incident slice header. When a slice header is located, data inserter 240 replaces 244 the QSC value in the slice header (which is redundant because the first coded macroblock of each slice is explicitly coded with the QSC value) with the DATA IN data to be embedded or hidden therein. In the five-bit QSC value coding of the MPEG-1 and MPEG-2 standards, the hidden data or secret message DATA IN may take the form of a five-bit digital word in which one bit is always a "1" so as to avoid the prohibited QSC value "00000". Thus, for example, the slice QSC value is replaced by the value "bbbb1" wherein "bbbb" are the next four bits in the DATA IN data. I.e. the data that is DATA IN is organized into four-bit segments and the four-bit segments are inserted into the hidden data channel in the slice headers of the MPEG compliant bitstream. Although this reduces the data rate at which hidden data is transmitted by about 20% because one bit is always a "1", it is very convenient to do with eight-bit data (each byte has eight bits) where the four most significant bits are embedded in one slice header and the four least significant bits are embedded in the next slice header. The data replacement continues 246 until there are no more slice headers available to receive DATA IN data as replacement data for the QSC value or until there is no more DATA IN to be embedded.

The mapping of the DATA IN data into the QSC value in the slice header need not take the exemplary simple form of "bbbb1" or "1bbbb" or other variation of four bits of data in conjunction with any one particular bit set to the value "1", so long as the value "00000" is avoided. For example, each of a succession of nine-bit segments (e.g., bytes) of data can be mapped into two successive five-bit symbols that avoid the "00000" value. By way of further example, in a standard definition video image, successive 149-bit segments of data can be mapped into thirty symbols of five bits each that avoid the "00000" value. To reduce the likelihood that pirates or others making unauthorized copies of the video bitstream including hidden data will discover that data is embedded in a slice-level data channel embedded in the slice header, more sophisticated mapping of the data into the QSC position in the slice header may be utilizes, such as ensuring that the hidden data value in the QSC position of the slice header is close in value to the QSC value explicitly coded in the first coded macroblock thereafter, so that the bitstream would appear more like a naturally-produced bitstream from a syntactical point of view. It is also noted that data need not be inserted into every slice header of the coded video bitstream.

Figure 7:
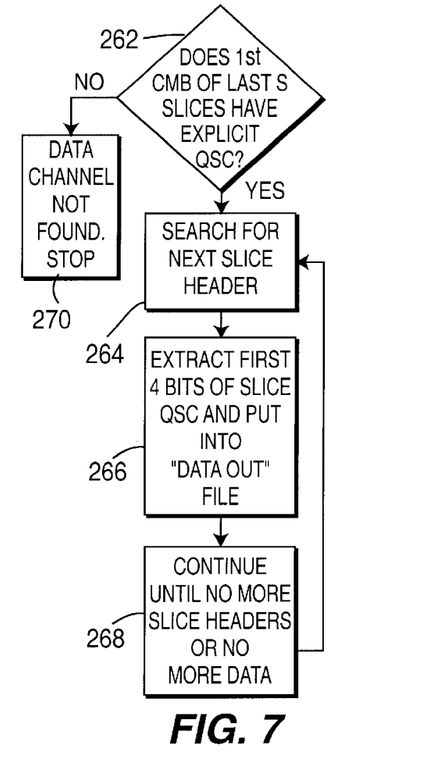
FIG. 7 is a schematic flow diagram illustrating the method of removing data in an MPEG or MPEG-like coding arrangement, for example, in the data remover of FIGS. 4 and 8.

The operation of data remover 260 of FIG. 4 may be understood with reference to FIG. 7 which is a schematic flow diagram illustrating the method of removing data hidden or embedded in a hidden data channel in a bitstream according to an MPEG or MPEG-like coding arrangement. Data remover 260 determines 262 whether the first coded macroblock of each slice includes an explicitly coded QSC value. If not, there is no hidden data channel and data remover 260 can stop 270 attempting to extract data therefrom. Since any MPEG coded bitstream is likely to include at least some slices in which the first coded macroblock includes an explicitly coded QSC value, a number of such blocks should be present in a sequence of slices before a decision can be made with confidence that a bitstream including a hidden data channel is being received. To that end, data remover 260 determines 262 when a sequence of "S" slices having explicitly coded QSC values in the first coded macroblocks thereof have been received, where S is a number of sufficient magnitude to provide the desired degree of confidence. If S is selected too small, data remover 260 will in some instances attempt to extract hidden data from a hidden data channel when no such data channel is present in the received bitstream, i.e. a false detection. On the other hand, if S is too large, some hidden data may be lost before data remover 260 determines that the received bitstream includes a hidden data channel and commences extracting data therefrom.

Once data remover 260 determines 262 that it is likely that a hidden data channel is present in the received bitstream, it commences extracting the hidden data therefrom by searching 264 for the next slice header. It then extracts 266 the first four bits of the coded QSC value in the slice header, i.e. it extracts the "bbbb" value of the hidden data where the data is of the form "bbbb1" as above. The extracted four bits of hidden data are stored a DATA OUT file or register. Data remover 260 continues 268 until no more slice headers are found or until the slice headers no longer contain data.

Although the hidden data is extracted and stored in four-bit increments, the data may be produced as DATA OUT in any convenient manner. For example, the four bit data bytes can be clocked into a shift register or other memory as they are extracted from the slice headers in the received bitstream and read out essentially in real time as eight-bit parallel words. Also for example, the four bit data bytes can be stored in a memory and read out later in any convenient format.

Figure 8:
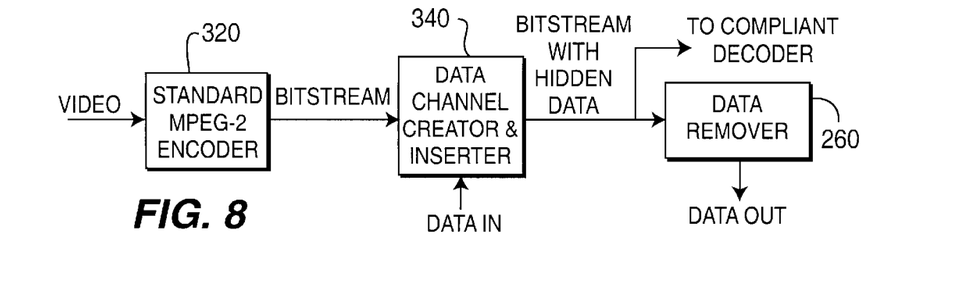

FIG. 8 is a schematic block diagram of an alternative exemplary embodiment of a macroblock coder 320 and data inserter 340 useful in accordance with the invention. Video data applied to standard MPEG-2 encoder 320 is compression coded in accordance with the MPEG-2 coding standard to produce an MPEG-2 compliant bitstream. Data channel creator and data inserter 340 modifies the MPEG compliant bitstream produced by encoder 320 by explicitly coding the value of the quantization scale code syntax element in the first coded macroblock following each slice header, so that the QSC syntax coding position in each slice header contains redundant QSC value data. These QSC syntax coding positions in the slice headers provide a data channel into which data may be inserted, which data is hidden data and need not be related in any way to the video data. Data channel creator and inserter 340 inserts the desired data "Data In" into the data channel created in the slice header QSC syntax element positions to produce a bitstream that is compliant with the MPEG-coding standard and which includes hidden data in the data channel. Ultimately, the compliant bitstream and DATA IN data hidden therein is applied to a standard MPEG-compliant decoder (not shown) for extracting the video data therefrom, and is also applied to a data remover 260 which locates the DATA IN data hidden in the data channel, i.e. in the QSC element position of the slice headers, to extract the embedded or hidden DATA IN data from the data channel and reproduce same as Data Out.

Figure 9:
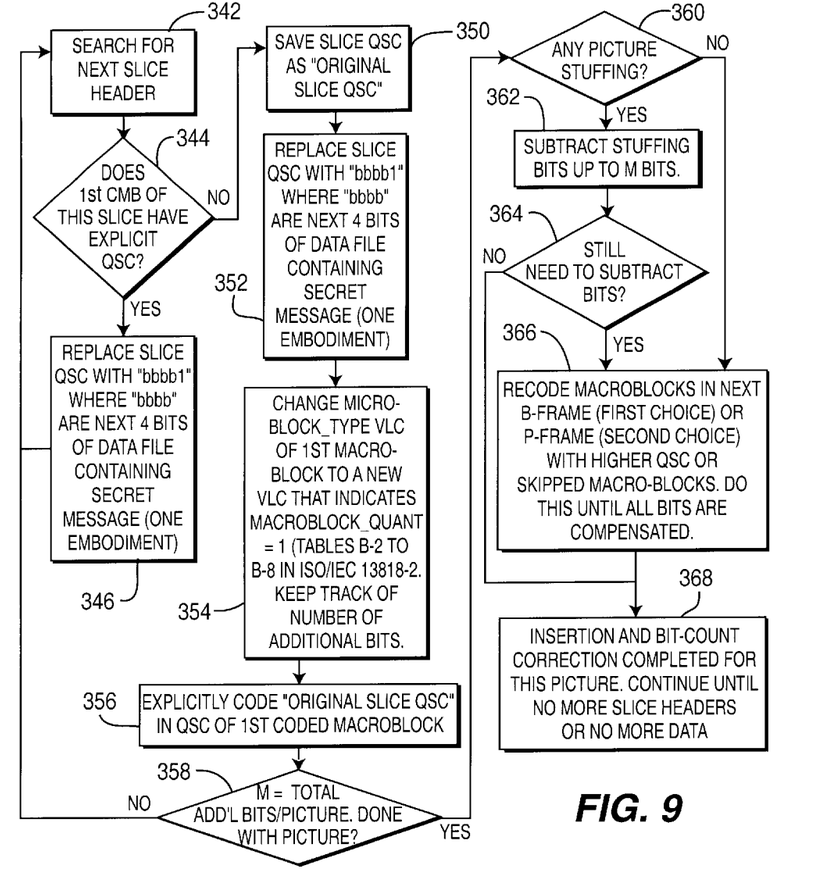
FIG. 9 is a schematic flow diagram illustrating the method of a slice coding loop and data inserter in an MPEG or MPEG-like coding arrangement, for example, in the data channel creator and inserter of FIG. 8.

The operation of data channel creator and inserter 340 of FIG. 8 may be understood with reference to FIG. 9 which is a schematic flow diagram illustrating the method of creating a data channel in slice headers and inserting data therein in an MPEG or MPEG-like coded bitstream. Data channel creator and inserter 340 searches 342 the MPEG coded bitstream for the next incident slice header. When a slice header is located, it is examined to determine 344 whether or not the first coded macroblock of the slice associated therewith has an explicitly coded QSC value. If the determination 344 is YES, then the data inserter portion of 340 replaces 346 the QSC value in the slice header (which is redundant because the first coded macroblock of each slice is explicitly coded with the QSC value) with the DATA IN data to be embedded or hidden therein. As above, the hidden data or secret message DATA IN may take the form of a five-bit digital word in which one bit is always a "1" so as to avoid the prohibited QSC value "00000". Thus, the slice QSC value is replaced 346 by the value "bbbb1" wherein "bbbb" are the next four bits in the DATA IN data. I.e. the data that is DATA IN is organized into four-bit segments and the four-bit segments are inserted into the hidden data channel in the slice headers of the MPEG compliant bitstream. The search 342 for the next slice header ten resumes and the foregoing operation repeats so long as the slice located has an explicitly coded QSC value in the first coded macroblock thereof, i.e. the determination 344 is YES.

If the first coded macroblock of a slice does not have an explicitly coded QSC value, determination 344 is NO and the QSC value of the slice header is saved, e.g., in a random access memory or other suitable memory, and is referred to as the "original slice QSC." The data inserter portion of 340 replaces 352 the QSC value in the slice header with the DATA IN data to be embedded or hidden therein, i.e. the slice QSC value is replaced 352 by the value "bbbb1" wherein "bbbb" are the next four bits in the DATA IN data. To restore the QSC value data to the slice, the first coded macroblock is changed 354 by changing the macroblock header to reflect that an explicitly coded QSC value is contained therein, although the QSC value has not yet been coded therein. As a result, whatever data is in the QSC value syntax element position in the slice header is rendered redundant as far as picture coding is concerned, thereby creating the data channel for the hidden data. Specifically, the macroblock header is changed 354 by changing "macroblock_type" variable length code (VLC) to a new VLC value that indicates that "macroblock_quant"=1 (in accordance with Tables B-2 to B-8 of the MPEG-2 standard ISO/IEC 13818-2) indicating explicit QSC coding. These two operations typically add 6–9 bits to the coded size of the first coded macroblock, or about 180–270 bits to a standard definition image frame. To avoid VBV underflow, the coded number of bits per frame is reduced as described below.

The original slice QSC value is then retrieved from memory and is explicitly coded 356 into the header of the first coded macroblock of that slice. The number M of additional bits added to the slice is accumulated 358 for the entire picture being coded for use later as described below. If the picture is not complete, decision 358 is NO and the process returns to the searching 342 for slice headers and repeating the process as thus far described until all slices in the picture are changed to have an explicitly coded QSC value in the first coded macroblock of each slice and all the QSC values in the slice headers are replaced 352 by four-bit segments of the hidden data.

When all slices of the picture have been so processed, decision 358 becomes YES. Number M now reflects the total number of additional bits that have been added to the MPEG-2 coded bitstream for the picture, and is compared 360 to determine the amount of picture-level zero stuffing (picture stuffing), if any, that is present in the bitstream. Picture stuffing relates to extra bits that are added to the video bitstream of the picture by the standard MPEG encoder to correct the buffer and bit counts of the compressed MPEG coded bitstream to prevent the overflow of the decoder video buffer verifier (VBV) buffer which would result in data being lost. The video bitstream as received by data channel creator and inserter 340 may or may not include picture stuffing bits, which bits do not carry any picture information.

Test 360 determines whether or not picture stuffing bits are present or not. If picture stuffing bits are present, the test 360 result is YES and the stuffing bits are reduced 362, i.e. removed, up to the number M bits. This is a preferred method for restoring the bit count consistent with the coded syntax. If the number $N_S$ of picture stuffing bits exceeds the number M of bits added to the bitstream by creating the hidden data channel in the slice headers and adding QSC values to the first coded macroblocks of the slices, then this subtraction 362 of M bits restores the bit count syntax of the bitstream and it will not overflow or underflow the decoder VBV buffer, and there is no need to remove additional bits so decision 364 is NO. The creation of a data channel for hidden data and the insertion of data therein is complete and insertion and correction of the bit count syntax is completed 368 for this picture. The process continues until all the pictures are so processed and there are no more slice headers or no more hidden data to be inserted.

If the number M of added bits exceeds the number $N_S$ of stuffing bits, then after the $N_S$ stuffing bits are subtracted an excess of M—$N_S$ bits remains in the bitstream so there is still a need to subtract bits and decision 364 is YES. Because there remains an excess of bits there is the possibility that the VBV buffer could underflow, at least in a small number of instances given that the number of extra bits is small. This can be avoided by recoding the syntax of the picture just processed so that the bit count and syntax coding are compliant with the coding standard using a known bit rate control scheme.

Alternatively, because reprocessing a past picture would require storing and significantly reprocessing the video bitstream of that picture, a practical alternative is to adjust the bit count of the next subsequent picture (and possibly one or more pictures after that) to even out the bit count over two or more successive pictures. To this end, macroblocks in the next picture, preferably in the next B-frame picture and less preferably in the next P-frame picture, are re-encoded 366 with higher QSC values or with skipped macroblocks until all of the excess M—NS bits are compensated. The data replacement and/or data channel creation 358 and the bit count correction 368 continue until there are no more slice headers available to receive DATA IN data as replacement data for the QSC value or until there is no more DATA IN to be embedded.

Another alternative arises because data need not be inserted into every slice header of the coded video bitstream, so that one may stop explicitly coding the first coded macroblock and inserting data in the slice headers. For example, where the explicit coding of the first coded macroblock of each slice of an already coded video bitstream would introduce a number of additional bits sufficient to make the bitstream non-compliant with the coding standard, e.g., either syntactically or from underflow of the VBV buffer, data hiding can be suspended until the next frame by suspending operation of data channel creator and inserter 340. Certain values of the QSC symbol may be reserved and used to indicate the commencement and termination of data hiding in the video bitstream. Alternatively to suspension of data hiding, selected macroblocks in the picture frame are re-quantized with higher QSC values to reduce the number of bits required in the video bitstream so that VBV buffer underflow is avoided. Other methods for requantization of the compressed video to reduce the video bit rate with minimal degradation of video quality are known.

The embodiments of FIGS. 4 and 8 also illustrate that the hidden data can be recovered by decoder 260 when the video bitstream is decoded, e.g., such as for authentication purposes, and so is available and may be re-encoded when the video bitstream is re-coded, if desired.

The present invention can be embodied as a computer implemented process or processes and/or apparatus for performing such computer-implemented process or processes, and can also be embodied in the form of a tangible storage medium containing a computer program or other machine-readable instructions (herein "computer program"), wherein when the computer program is loaded into a computer or other processor (herein "computer") and/or is executed by the computer, the computer becomes an apparatus for practicing the invention. Storage media for containing such computer program include, for example, floppy disks and diskettes, compact disks (CD)-ROMs (whether or not writeable), DVD digital disks, RAM and ROM memories, computer hard drives and back-up drives, and any other storage medium readable by a computer. The invention can also be embodied in the form of a computer program, for example, whether stored in a storage medium or transmitted over a transmission medium such as electrical conductors, fiber optics or other light conductors, or by electromagnetic radiation, wherein when the computer program is loaded into a computer and/or is executed by the computer, the computer becomes an apparatus for practicing the invention. The invention may be implemented on a general purpose microprocessor or on a digital processor specifically configured to practice the invention. When a general-purpose microprocessor is employed, the computer program code configures the circuitry of the microprocessor to create specific logic circuit arrangements.

Figure 10:
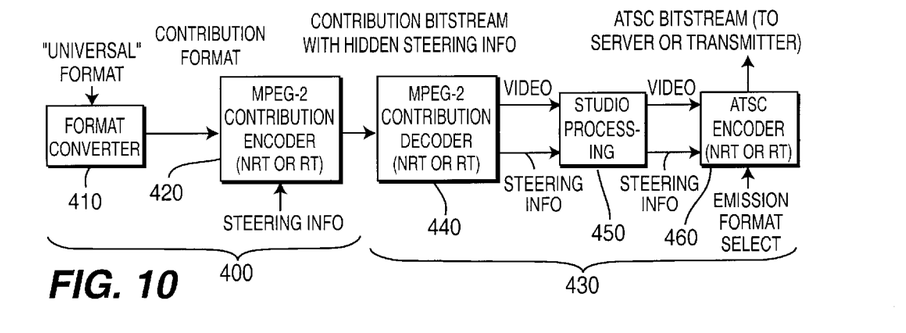
FIG. 10 is a schematic block diagram of an exemplary application of a data embedding arrangement in accordance with the invention.

FIG. 10 is a schematic block diagram of an exemplary application of a data embedding arrangement in accordance with the invention. A source 400 such as a network source or a post production house transmits coded video information in accordance with the invention to one or more recipients 430 such as one or more affiliate broadcasters. The video may originate in any format, referred to as universal format, and is converted into the desired contribution format by format converter 410. Universal format may be, for example, a 1920×1440 pixel image formatted as 10-bit red, green and blue (RGB) pixels at a 24 or 30 frame per second rate and may be converted to a 1920×1080 pixel image. The contribution format video bitstream is processed by encoder 420, which may be like the coders shown in FIGS. 4 and 8, to embed the "Steering Info" as the hidden data in a hidden data channel in the contribution bitstream in like manner to that described above in relation to FIGS. 4–9. The contribution bitstream may be a 300 Mb/s MPEG-2 video bitstream with I-frame only coding using a 4:2:2 luminance-chrominance format with the main profile set to high-level functionality as used for high-definition video for broadcast studio applications. MPEG-2 contribution coder 420 may operate in a real-time (RT) or in a non-real-time (NRT) manner.

Each recipient 430 utilizes a MPEG-2 contribution decoder 440 which includes a standard MPEG-2 decoder to produce the video bitstream applied to studio processing equipment 450 and a data remover similar to data remover 260 described above to extract the hidden Steering Info contained in the hidden data channel in the slice headers of the received bitstream. MPEG-2 contribution decoder 440 operates in the same one of a real-time (RT) or in a non-real-time (NRT) manner as does contribution coder 420. Studio processing equipment 450 inserts other video information, such as a fixed position station identification or station logo or a moving display such as a "ticker tape" message scrolling across the picture, into the video bitstream from decoder 430. The Steering Info can be utilized to control video processing in studio processing equipment 450, in ATSC digital format encoder 460, or both, and can be transmitted in the ATSC bitstream to the server or broadcast or other transmitter as desired. Emission encoder 460 is also responsive to emission format select inputs to select the desired ATSC coding format.

The hidden data Steering Info may, for example, be derived from analysis of the contribution video before it is coded in encoder 420 and indicate the optimum coding to obtain the highest quality signal in each of the available emission formats that may be used by various recipients, i.e. to guide or instruct a downstream processor regarding how best to process the video data or to control another function of the downstream processor. Alternatively, the hidden data may be utilized to transmit other information such as billing information, voice messaging, the identification of the originating processing method, the video processing history, site identification and/or location, G.P.S. coordinates thereof or of another location, time/date stamps, and the like. In an aviation application, the hidden data channel may be utilized as a voice communication channel from the pilot or airborne personnel to the ground or home-base personnel receiving the coded video bitstream. Similarly, in a digital cinema application, hidden data may be inserted into the digital bitstream to uniquely brand each copy thereof, for example, with the date, time, and/or location, and/or other tags, relating to the origin of the copy to allow forensic analysis to identify a stolen bitstream.

While the present invention has been described in terms of the foregoing exemplary embodiments, variations within the scope and spirit of the present invention as defined by the claims following will be apparent to those skilled in the art. For example, while the foregoing embodiments are described in terms of the MPEG-1 and MPEG-2 coding formats, the invention is useful with any coding format the permits or requires redundant encoding of one or more parameters where that encoding includes implicit and overriding values, such as the implicit QSC values specified by the QSC element in the MPEG slice headers and the implicit QSC value in the MPEG macroblocks that may be explicitly overridden, whereby by making the implicit value explicit, the slice header values become redundant and may be replaced by unrelated data to be embedded in the bitstream.

Further, data hiding according to the invention, in which the hidden data is typically lost in a standard MPEG-compliant decoder, may be utilized in conjunction with conventional watermarking, which typically survives one or more decoding and recoding operations, to provide indication that a video bitstream has been altered, tempered with or reproduced by other than an authorized person who utilizes the data hiding invention to maintain the hidden data in the copy, e.g., by utilizing data coders and decoders as described herein.

What is claimed is:

1. A method for embedding data in a coded bitstream wherein the coded bitstream has at least one syntax element that can be coded in plural positions, the value thereof coded in one position being overriding respecting the value coded in the other position, comprising:

coding a value of the one syntax element in the overriding syntax element position; and inserting the embedded data into the other syntax element position.

2. The method of claim 1 further comprising creating the overriding syntax element position in the coded bitstream while coding the bitstream.

3. The method of claim 1 further comprising decoding the coded bitstream responsive to the overriding syntax element value thereof.

4. The method of claim 1 wherein the coded bitstream is coded according to one of MPEG and MPEG-like coding, and wherein the overriding syntax element position is in a first coded macroblock following a slice header.

5. A method for embedding data in a coded bitstream wherein the coded bitstream has at least one syntax element that can be coded in plural positions, the value thereof coded in one position being overriding respecting the value coded in the other position, comprising:

coding a value of the one syntax element in the overriding syntax element position; and inserting the embedded data into the other syntax element position, wherein said coding a value includes re-coding the coded bitstream to create the overriding syntax element position, and inserting the value of the one syntax element therein.

6. The method of claim 5 further comprising re-coding the coded bitstream to undo any change in the bit count caused by said re-coding the coded bitstream to create the overriding syntax element position and inserting the value of the one syntax element therein.

7. A method for embedding data in a coded bitstream wherein the coded bitstream has at least one syntax element that can be coded in plural positions, the value thereof coded in one position being overriding respecting the value coded in the other position, comprising:

coding a value of the one syntax element in the overriding syntax element position; and inserting the embedded data into the other syntax element position, decoding the coded bitstream responsive to the overriding syntax element value thereof;

searching for the other syntax element position, and extracting the embedded data therefrom.

8. A method for embedding data in a coded bitstream wherein the coded bitstream has at least one syntax element that can be coded in plural positions, the value thereof coded in one position being overriding respecting the value coded in the other position, comprising:

coding a value of the one syntax element in the overriding syntax element position; and inserting the embedded data into the other syntax element position, wherein said syntax element value includes N bits and wherein said embedded data includes at least M x N bits, wherein said inserting the embedded data comprises:

separating the embedded data into at least M segments of N bits each, and inserting one of the M segments into a series of at least M other syntax element positions.

9. A method for embedding data in a coded bitstream having headers and data blocks wherein the coded bitstream has at least one syntax element that can be coded in a header and in a data block position, the value thereof coded in one of the header and the data block positions being overriding respecting the value coded in the other of the header and data block positions, comprising:

coding a value of the one syntax element in the overriding one of the header and data block positions; and inserting the embedded data into the other of the header and data block positions.

10. The method of claim 9 further comprising creating the overriding one of the header and data block positions in the coded bitstream while coding the bitstream.

11. The method of claim 9 further comprising decoding the coded bitstream responsive to the syntax element value in the overriding one of the header and data block positions thereof.

12. The method of claim 9 wherein the data block position is the overriding syntax element position.

13. The method of claim 12 wherein the coded bitstream is coded according to one of MPEG and MPEG-like coding, and wherein the data block position is a first coded macroblock following a slice header.

14. A method for embedding data in a coded bitstream having headers and data blocks wherein the coded bitstream has at least one syntax element that can be coded in a header and in a data block position, the value thereof coded in one of the header and the data block positions being overriding respecting the value coded in the other of the header and data block positions, comprising:

coding a value of the one syntax element in the overriding one of the header and data block positions; and inserting the embedded data into the other of the header and data block positions, wherein said coding a value includes re-coding the coded bitstream to create the overriding one of the header and data block positions, and inserting the value of the one syntax element therein.

15. The method of claim 14 further comprising re-coding the coded bitstream to undo any change in the bit count caused by said re-coding the coded bitstream to create the overriding one of the header and data block positions and inserting the value of the one syntax element therein.

16. A method for embedding data in a coded bitstream having headers and data blocks wherein the coded bitstream has at least one syntax element that can be coded in a header and in a data block position, the value thereof coded in one of the header and the data block positions being overriding respecting the value coded in the other of the header and data block positions, comprising:

coding a value of the one syntax element in the overriding one of the header and data block positions;

inserting the embedded data into the other of the header and data block positions, decoding the coded bitstream responsive to the syntax element value in the overriding one of the header and data block positions thereof;

searching for the other one of the header and data block positions, and extracting the embedded data therefrom.

17. A method for embedding data in a coded bitstream having headers and data blocks wherein the coded bitstream has at least one syntax element that can be coded in a header and in a data block position, the value thereof coded in one of the header and the data block positions being overriding respecting the value coded in the other of the header and data block positions, comprising:

coding a value of the one syntax element in the overriding one of the header and data block positions; and inserting the embedded data into the other of the header and data block positions, wherein said syntax element value includes N bits and wherein said embedded data includes at least M x N bits, wherein said inserting the embedded data comprises:

separating the embedded data into at least M segments of N bits each, and inserting one of the M segments into a series of at least M ones of the other of the header and data block positions.

18. A method for hiding data in an MPEG coded bitstream, wherein the coded bitstream includes a series of slices each having a slice header and at least one macroblock following the slice header, comprising:

explicitly coding a quantization scale code in at least the first coded macroblock following each slice header, and hiding data in the quantization scale code position of at least one of the slice headers.

19. A method for hiding data in an MPEG coded bitstream, wherein the coded bitstream includes a series of slices each having a slice header and at least one macroblock following the slice header, comprising:

explicitly coding a quantization scale code in at least the first coded macroblock following each slice header, and hiding data in the quantization scale code position of at least one of the slice headers, wherein coding the coded bitstream includes said explicitly coding a quantization scale code in at least the first coded macroblock following each slice header.

20. A method for hiding data in an MPEG coded bitstream, wherein the coded bitstream includes a series of slices each having a slice header and at least one macroblock following the slice header, comprising:

explicitly coding a quantization scale code in at least the first coded macroblock following each slice header, and hiding data in the quantization scale code position of at least one of the slice headers, wherein said explicitly coding a quantization scale code value includes recoding the coded bitstream to code the first macroblock following the slice header for explicit quantization scale factor coding, and inserting the value of the quantization scale code therein.

21. The method of claim 20 further comprising re-coding the coded bitstream to undo any increase in the bit count caused by said re-coding the coded bitstream to code the first macroblock following the slice header for explicit quantization scale factor coding and inserting the value of the quantization scale code therein.

22. A method for hiding data in an MPEG coded bitstream, wherein the coded bitstream includes a series of slices each having a slice header and at least one macroblock following the slice header, comprising:

explicitly coding a quantization scale code in at least the first coded macroblock following each slice header, hiding data in the quantization scale code position of at least one of the slice headers; and creating the explicitly coded quantization scale code in the first macroblock following the slice header while coding the bitstream.

23. A method for hiding data in an MPEG coded bitstream, wherein the coded bitstream includes a series of slices each having a slice header and at least one macroblock following the slice header, comprising:

explicitly coding a quantization scale code in at least the first coded macroblock following each slice header, hiding data in the quantization scale code position of at least one of the slice headers; and decoding the coded bitstream responsive to the quantization scale code value in the first coded macroblock following the slice header.

24. The method of claim 23 further comprising:

searching for the slice headers; and extracting the hidden data therefrom.

25. A method for hiding data in an MPEG coded bitstream, wherein the coded bitstream includes a series of slices each having a slice header and at least one macroblock following the slice header, comprising:

explicitly coding a quantization scale code in at least the first coded macroblock following each slice header, and hiding data in the quantization scale code position of at least one of the slice headers, wherein said quantization scale code value includes N bits and wherein said hidden data includes at least M x N bits, wherein said inserting the hidden data comprises:

separating the hidden data into at least M segments of N bits each, and inserting one of the M segments into a series of at least M ones of the slice header quantization scale code positions.

26. A coder for embedding data in a coded bitstream having headers and data blocks wherein the coded bitstream has at least one syntax element that can be coded in a header and in a data block position, comprising:

means for coding a bitstream having at least one syntax element that can be coded in a header and in a data block position, wherein the value thereof coded in one of the header and the data block positions is overriding respecting the value coded in the other of the header and data block positions;

means for coding a value of the one syntax element in the overriding one of the header and data block positions; and means for inserting the embedded data into the other of the header and data block positions.

27. A coder for embedding data in a coded bitstream having headers and data blocks wherein the coded bitstream has at least one syntax element that can be coded in a header and in a data block position, comprising:

means for coding a bitstream having at least one syntax element that can be coded in a header and in a data block position, wherein the value thereof coded in one of the header and the data block positions is overriding respecting the value coded in the other of the header and data block positions;

means for coding a value of the one syntax element in the overriding one of the header and data block positions; and means for inserting the embedded data into the other of the header and data block positions, wherein said means for coding a value includes:

means for re-coding the coded bitstream to create the overriding one of the header and data block positions, and means for inserting the value of the one syntax element therein.

28. The coder of claim 27 further comprising means for re-coding the coded bitstream to undo any change in the bit count caused by re-coding the coded bitstream to create the overriding one of the header and data block positions and inserting the value of the one syntax element therein.

29. A storage medium encoded with machine-readable computer instructions for embedding data in a coded bitstream wherein the coded bitstream has at least one syntax element that can be coded in plural positions, the value thereof coded in one position being overriding respecting the value coded in the other position, comprising:

means for causing a computer to code a value of the one syntax element in the overriding syntax element position; and means for causing the computer to insert the embedded data into the other syntax element position.

30. The storage medium of claim 29 further comprising means for causing the computer to create the overriding syntax element position in the coded bitstream while coding the bitstream.

31. A storage medium encoded with machine-readable computer instructions for embedding data in a coded bitstream wherein the coded bitstream has at least one syntax element that can be coded in plural positions, the value thereof coded in one position being overriding respecting the value coded in the other position, comprising:

means for causing a computer to code a value of the one syntax element in the overriding syntax element position; and means for causing the computer to insert the embedded data into the other syntax element position;

wherein said means for causing a computer to code a value includes means for causing the computer to re-code the coded bitstream to create the overriding syntax element position, and means for causing the computer to insert the value of the one syntax element therein.

32. The storage medium of claim 31 further comprising means for causing the computer to re-code the coded bitstream to undo any change in the bit count caused by said means for causing the computer to re-code the coded bitstream to create the overriding syntax element position and means for causing the computer to insert the value of the one syntax element therein.

* * * * *